(12) United States Patent
Spooner et al.

(10) Patent No.: US 9,473,046 B2
(45) Date of Patent: Oct. 18, 2016

(54) ELECTRICAL POWER CONVERSION SYSTEM AND METHOD

(75) Inventors: Edward Spooner, Bishop Auckland (GB); David Taaffe, Dublin (IE)

(73) Assignee: Openhydro IP Limited, Dublin (IE)

( * ) Notice: Subject to any disclaimer, the term of this patent is extended or adjusted under 35 U.S.C. 154(b) by 1014 days.

(21) Appl. No.: 13/498,836

(22) PCT Filed: Sep. 29, 2010

(86) PCT No.: PCT/EP2010/064449
§ 371 (c)(1),
(2), (4) Date: Aug. 6, 2012

(87) PCT Pub. No.: WO2011/039249
PCT Pub. Date: Apr. 7, 2011

(65) Prior Publication Data
US 2012/0187680 A1    Jul. 26, 2012

(30) Foreign Application Priority Data
Sep. 29, 2009  (EP) .................................... 09171707

(51) Int. Cl.
| F03B 13/00 | (2006.01) |
| H02P 6/00 | (2016.01) |
| H02M 7/54 | (2006.01) |
| H02J 3/36 | (2006.01) |
| B60L 8/00 | (2006.01) |

(52) U.S. Cl.
CPC ................... *H02M 7/54* (2013.01); *H02J 3/36* (2013.01); *B60L 8/00* (2013.01); *Y02E 60/60* (2013.01)

(58) Field of Classification Search
CPC .......... H02M 7/54; H02M 7/539; H02J 3/36; H02J 2003/365; B60L 8/00

USPC ............. 318/700, 148, 400.01; 323/201–204
See application file for complete search history.

(56) References Cited

U.S. PATENT DOCUMENTS

| 228,467 | A | 6/1880 | Maclay |
| 928,536 | A | 7/1909 | Pino |
| 1,710,103 | A | 4/1929 | Nelson |
| 2,054,142 | A | 9/1936 | Sharp |

(Continued)

FOREIGN PATENT DOCUMENTS

| CA | 2388513 | 8/2000 |
| CA | 2352673 | 1/2003 |

(Continued)

OTHER PUBLICATIONS

Michael Owen, Homopolar Electro-mechanical Rotary Power, IEEE MELECON 2004, May 12-15, 2004, Dubrovnik, Croatia.*

(Continued)

*Primary Examiner* — Bentsu Ro
*Assistant Examiner* — Zemenay Truneh
(74) *Attorney, Agent, or Firm* — Gardner, Linn, Burkhart & Flory, LLP

(57) ABSTRACT

A system and method for electrical power conversion, with the system being intended for use in converting a high voltage DC power output from a turbine generator to an AC power signal that is suitable for connecting to an AC power grid. The system utilizes a mechanical coupling between a synchronous motor driving a synchronous generator in order to provide isolation, as well as allowing for control of the real power output by the system.

13 Claims, 5 Drawing Sheets

(56) References Cited

U.S. PATENT DOCUMENTS

| | | | |
|---|---|---|---|
| 2,470,797 A | 5/1949 | Thomas | |
| 2,501,696 A | 3/1950 | Souczek | |
| 2,563,279 A | 8/1951 | Rushing | |
| 2,658,453 A | 11/1953 | Walters | |
| 2,782,321 A | 2/1957 | Fischer | |
| 2,792,505 A | 5/1957 | Baudry | |
| 2,874,547 A | 2/1959 | Fiore | |
| 3,078,680 A | 2/1963 | Wapsala | |
| 3,209,156 A | 9/1965 | Struble, Jr. | |
| 3,292,023 A | 12/1966 | Korber | |
| 3,342,444 A | 9/1967 | Nelson | |
| 3,355,998 A | 12/1967 | Roemisch | |
| 3,384,787 A | 5/1968 | Schwartz | |
| 3,422,275 A | 1/1969 | Braikevitch et al. | |
| 3,477,236 A | 11/1969 | Burrus | |
| 3,487,805 A | 1/1970 | Satterthwaite et al. | |
| 3,708,251 A | 1/1973 | Pierro | |
| 3,986,787 A | 10/1976 | Mouton, Jr. et al. | |
| 3,987,638 A | 10/1976 | Burkhardt et al. | |
| 4,039,926 A * | 8/1977 | Steigerwald | 363/138 |
| 4,095,918 A | 6/1978 | Mouton et al. | |
| 4,163,904 A | 8/1979 | Skendrovic | |
| 4,219,303 A | 8/1980 | Mouton, Jr. et al. | |
| 4,274,009 A | 6/1981 | Parker, Sr. | |
| 4,367,413 A | 1/1983 | Nair | |
| 4,421,990 A | 12/1983 | Heuss et al. | |
| 4,427,897 A | 1/1984 | Migliori | |
| 4,496,845 A | 1/1985 | Ensign et al. | |
| 4,523,878 A | 6/1985 | Richart et al. | |
| 4,541,367 A | 9/1985 | Lindberg | |
| 4,613,762 A | 9/1986 | Soderholm | |
| 4,720,640 A | 1/1988 | Anderson | |
| 4,740,711 A | 4/1988 | Sato et al. | |
| 4,744,697 A | 5/1988 | Coppens | |
| 4,744,698 A | 5/1988 | Dallimer et al. | |
| 4,810,135 A | 3/1989 | Davenport et al. | |
| 4,867,605 A | 9/1989 | Myers et al. | |
| 4,868,408 A | 9/1989 | Hesh | |
| 4,868,970 A | 9/1989 | Schultz et al. | |
| 4,990,810 A | 2/1991 | Newhouse | |
| 5,495,221 A | 2/1996 | Post | |
| 5,517,383 A | 5/1996 | Webb | |
| 5,592,816 A | 1/1997 | Williams | |
| 5,606,791 A | 3/1997 | Fougere et al. | |
| 5,609,441 A | 3/1997 | Khachaturian | |
| 5,656,880 A | 8/1997 | Clark | |
| 5,662,434 A | 9/1997 | Khachaturian | |
| 5,715,590 A | 2/1998 | Fougere et al. | |
| 5,800,093 A | 9/1998 | Khachaturian | |
| 5,998,905 A | 12/1999 | Fougere et al. | |
| 6,039,506 A | 3/2000 | Khachaturian | |
| 6,109,863 A | 8/2000 | Milliken | |
| 6,166,472 A | 12/2000 | Pinkerton | |
| 6,168,373 B1 | 1/2001 | Vauthier | |
| 6,232,681 B1 | 5/2001 | Johnston et al. | |
| 6,242,840 B1 | 6/2001 | Denk et al. | |
| 6,300,689 B1 | 10/2001 | Smalser | |
| 6,367,399 B1 | 4/2002 | Khachaturian | |
| 6,406,251 B1 | 6/2002 | Vauthier | |
| 6,409,466 B1 | 6/2002 | Lamont | |
| 6,445,099 B1 | 9/2002 | Roseman | |
| 6,476,709 B1 | 11/2002 | Wuidart et al. | |
| 6,612,781 B1 | 9/2003 | Jackson | |
| 6,648,589 B2 | 11/2003 | Williams | |
| RE38,336 E | 12/2003 | Williams | |
| 6,729,840 B2 | 5/2004 | Williams | |
| 6,770,987 B1 | 8/2004 | Sogard et al. | |
| 6,777,851 B2 | 8/2004 | Maslov | |
| 6,806,586 B2 | 10/2004 | Wobben | |
| 6,840,713 B1 | 1/2005 | Schia et al. | |
| 6,843,191 B1 | 1/2005 | Makotinsky | |
| 6,857,821 B2 | 2/2005 | Steenhuis et al. | |
| 6,894,416 B1 | 5/2005 | Leijon et al. | |
| 6,957,947 B2 | 10/2005 | Williams | |
| 6,995,479 B2 | 2/2006 | Tharp | |
| 6,998,730 B2 | 2/2006 | Tharp | |
| 7,061,743 B2 * | 6/2006 | Kim et al. | 361/185 |
| 7,190,087 B2 | 3/2007 | Williams | |
| D543,495 S | 5/2007 | Williams | |
| 7,275,891 B2 | 10/2007 | Owen et al. | |
| 7,352,078 B2 | 4/2008 | Gehring | |
| 7,378,750 B2 | 5/2008 | Williams | |
| 7,425,772 B2 | 9/2008 | Novo Vidal | |
| 7,471,009 B2 | 12/2008 | Davis et al. | |
| 7,527,006 B2 | 5/2009 | Khachaturian | |
| 7,611,307 B2 | 11/2009 | Owen et al. | |
| 7,845,296 B1 | 12/2010 | Khachaturian | |
| 7,874,788 B2 | 1/2011 | Stothers et al. | |
| 8,022,581 B2 | 9/2011 | Stiesdal | |
| 2002/0034437 A1 | 3/2002 | Williams | |
| 2003/0044272 A1 | 3/2003 | Addie et al. | |
| 2003/0137149 A1 * | 7/2003 | Northrup et al. | 290/44 |
| 2003/0155829 A1 | 8/2003 | McMullen et al. | |
| 2003/0168864 A1 | 9/2003 | Heronemus et al. | |
| 2003/0193198 A1 | 10/2003 | Wobben | |
| 2003/0218338 A1 | 11/2003 | O'Sullivan et al. | |
| 2004/0021386 A1 | 2/2004 | Swett | |
| 2004/0021437 A1 * | 2/2004 | Maslov | B60L 8/00 318/400.01 |
| 2004/0201299 A1 | 10/2004 | Naritomi et al. | |
| 2004/0227500 A1 | 11/2004 | O'Meara | |
| 2004/0232792 A1 | 11/2004 | Enfourth | |
| 2004/0262926 A1 | 12/2004 | Hansen | |
| 2005/0005592 A1 | 1/2005 | Fielder | |
| 2005/0031442 A1 | 2/2005 | Williams | |
| 2005/0073151 A1 | 4/2005 | Diamontopoulos | |
| 2006/0261597 A1 | 11/2006 | Gehring | |
| 2007/0018459 A1 | 1/2007 | Williams | |
| 2007/0063448 A1 | 3/2007 | Kowalczyk | |
| 2007/0164626 A1 | 7/2007 | Taniguchi et al. | |
| 2007/0231072 A1 | 10/2007 | Jennings et al. | |
| 2007/0241566 A1 | 10/2007 | Kuehnle | |
| 2007/0262668 A1 | 11/2007 | Brisson et al. | |
| 2007/0291426 A1 | 12/2007 | Kasunich et al. | |
| 2008/0012538 A1 | 1/2008 | Stewart et al. | |
| 2009/0278357 A1 | 11/2009 | Williams | |
| 2010/0025998 A1 | 2/2010 | Williams | |
| 2010/0026002 A1 | 2/2010 | Spooner | |
| 2010/0068037 A1 | 3/2010 | Ives | |
| 2010/0133838 A1 | 6/2010 | Borgen | |
| 2010/0172698 A1 | 7/2010 | Ives et al. | |
| 2010/0201129 A1 | 8/2010 | Holstein et al. | |
| 2010/0232885 A1 | 9/2010 | Ives et al. | |
| 2010/0295388 A1 | 11/2010 | Ives et al. | |
| 2011/0018274 A1 | 1/2011 | Ives et al. | |
| 2011/0088253 A1 | 4/2011 | Ives et al. | |
| 2011/0110770 A1 | 5/2011 | Spooner et al. | |
| 2011/0291419 A1 | 12/2011 | Dunne et al. | |
| 2011/0293399 A1 | 12/2011 | Dunne et al. | |
| 2011/0298216 A1 | 12/2011 | Ives et al. | |
| 2011/0304148 A1 | 12/2011 | Dunne et al. | |
| 2012/0027522 A1 | 2/2012 | Ives et al. | |
| 2012/0175877 A1 | 7/2012 | Ives et al. | |
| 2012/0235412 A1 | 9/2012 | Dunne et al. | |

FOREIGN PATENT DOCUMENTS

| | | |
|---|---|---|
| CH | 260699 | 4/1947 |
| CH | 146935 | 8/1983 |
| DE | 3116740 | 11/1982 |
| DE | 3638129 | 5/1988 |
| DE | 3718954 | 12/1988 |
| DE | 19948198 | 4/2001 |
| DE | 10101405 | 7/2002 |
| DE | 20308901 | 9/2003 |
| DE | 10244038 | 4/2004 |
| DE | 102007016380 | 10/2008 |
| EP | 1318299 | 12/2003 |
| EP | 1564455 | 1/2005 |
| EP | 1691377 | 2/2006 |
| EP | 1863162 A2 | 5/2007 |
| EP | 1876350 | 1/2008 |
| EP | 1878912 | 1/2008 |
| EP | 1878913 | 1/2008 |

(56) References Cited

FOREIGN PATENT DOCUMENTS

| | | |
|---|---|---|
| EP | 1879280 | 1/2008 |
| EP | 1879280 A1 | 1/2008 |
| EP | 1878911 | 9/2008 |
| EP | 1992741 | 11/2008 |
| EP | 1885047 | 12/2008 |
| EP | 1980670 | 7/2009 |
| EP | 2088311 | 8/2009 |
| EP | 2110910 | 10/2009 |
| EP | 2112370 | 10/2009 |
| EP | 1980746 | 6/2010 |
| EP | 2199199 | 6/2010 |
| EP | 2199598 | 6/2010 |
| EP | 2199599 | 6/2010 |
| EP | 2199601 | 6/2010 |
| EP | 2199602 | 6/2010 |
| EP | 2199603 | 6/2010 |
| EP | 2200170 | 6/2010 |
| EP | 2071709 | 9/2010 |
| EP | 2209175 | 9/2010 |
| EP | 2241749 | 10/2010 |
| EP | 2302204 | 3/2011 |
| EP | 2302755 | 3/2011 |
| EP | 2302766 | 3/2011 |
| FR | 2823177 | 10/2002 |
| FR | 2859495 | 3/2005 |
| GB | 204505 | 10/1923 |
| GB | 924347 | 4/1963 |
| GB | 980575 | 1/1965 |
| GB | 1131352 | 10/1968 |
| GB | 1413835 | 11/1975 |
| GB | 2316461 | 2/1998 |
| GB | 2344843 | 6/2000 |
| GB | 2408294 | 5/2005 |
| GB | 2431628 | 5/2007 |
| GB | 2434413 | 7/2007 |
| GB | 2447514 | 9/2008 |
| JP | 59203881 | 11/1984 |
| JP | 63055370 | 3/1988 |
| JP | 01043908 | 2/1989 |
| JP | 2000341818 | 12/2000 |
| JP | 2005069025 | 3/2005 |
| JP | 2005248822 | 9/2005 |
| JP | 2006094645 | 4/2006 |
| JP | 2006109560 A | 4/2006 |
| JP | 2007255614 | 10/2007 |
| JP | 2007291882 | 11/2007 |
| WO | WO9844372 | 10/1998 |
| WO | WO9852819 | 11/1998 |
| WO | WO9966623 | 12/1999 |
| WO | WO0077393 | 12/2000 |
| WO | WO0134973 | 5/2001 |
| WO | WO0134977 | 5/2001 |
| WO | WO02099950 | 12/2002 |
| WO | WO03014561 | 2/2003 |
| WO | WO03025385 | 3/2003 |
| WO | WO03046375 | 6/2003 |
| WO | WO2004015264 | 2/2004 |
| WO | WO2004027257 | 4/2004 |
| WO | 2004/107549 A1 | 12/2004 |
| WO | WO2004113717 | 12/2004 |
| WO | WO2005045243 | 5/2005 |
| WO | WO2005061887 | 7/2005 |
| WO | WO2005078233 | 8/2005 |
| WO | WO2005080789 | 9/2005 |
| WO | WO2005116443 | 12/2005 |
| WO | WO2006029496 | 3/2006 |
| WO | WO2007043894 | 4/2007 |
| WO | WO2007055585 | 5/2007 |
| WO | WO2007083105 | 7/2007 |
| WO | WO2007086814 | 8/2007 |
| WO | WO2007125349 | 11/2007 |
| WO | WO2008004877 | 1/2008 |
| WO | WO2008006614 | 1/2008 |
| WO | WO2008050149 | 5/2008 |
| WO | WO2008081187 | 7/2008 |
| WO | 2009/016409 A2 | 2/2009 |
| WO | WO2010118766 | 10/2010 |
| WO | WO2011039249 | 4/2011 |
| WO | WO2011039255 | 4/2011 |
| WO | WO2011039267 | 7/2011 |

OTHER PUBLICATIONS

Michael Owens, Homopolar Electro-mechanical Rotary Power Converter (HERPC), IEEE Melecon 2004, May 12-15, Dubrovnik Croatia.

International Search Report of corresponding International Application PCT/EP2010/064449 dated Nov. 30, 2010.

International Preliminary Report on Patentability of corresponding International Application PCT/EP2010/064449 dated Oct. 4, 2011.

Submission under Article 34 in corresponding International Application PCT/EP2010/064449 dated Jul. 22, 2011.

\* cited by examiner

ELECTRICAL POWER CONVERSION SYSTEM AND METHOD

CROSS REFERENCE TO RELATED APPLICATIONS

The present application claims the priority benefits of International Patent Application No. PCT/EP2010/064449, filed on Sep. 29, 2010, and also of European Patent Application No. EP 09171707.4, filed on Sep. 29, 2009, which are hereby incorporated by reference in their entireties.

FIELD OF THE INVENTION

This invention relates to a power conversion system and method, in particular a power conversion system for a tidal power generation arrangement for connection to an AC electrical grid.

BACKGROUND OF THE INVENTION

Many forms of power generation exploiting renewable energy sources employ electrical generators, and cause the generator to be driven at a speed that varies according to the prevailing conditions. For example, a wind turbine drives its generator at a speed dependent on the wind speed, a tidal-current turbine drives its generator at a speed dependent on the prevailing speed of the water flow, and a wave power converter may include a generator that is driven at a speed that varies in a cyclic fashion. In such cases, the voltage and frequency of the electrical output from the generator constantly vary. However, electrical grids operate at fixed voltage and frequency and strict regulations embodied in a grid code are applied to generating systems that are to be connected to the grid.

For large generating systems such as wind farms or groups of tidal-current turbines, grid codes typically include the following principal requirements:
1. The generating system should be able to contribute to the control of grid frequency by having the capacity to modify its real power output independently of the prevailing wind speed, tidal velocity etc.
2. The generating system should be able to contribute to the control of grid voltage by having the capacity to supply reactive power up to a certain defined proportion of the real power supplied.
3. The generating system should be able to produce current with a sinusoidal waveform. The current should not have a DC component, and all harmonic and sub-harmonic components should be less than a prescribed upper limit.
4. The generating system should be able to remain connected to the grid throughout a low-voltage transient fault on the grid, and so be ready to continue supplying power when the fault is cleared.

In order to comply with the first of these regulations, most large wind turbines include a pitch control mechanism to adjust the mechanical power produced by the blades up to a maximum value corresponding to the prevailing wind speed.

To comply with the second and third requirements, the electrical power from the generator is converted to fixed-frequency, 50 or 60 Hz, three-phase ac by a power electronic system usually employing a pulse-width-modulated (PWM) inverter.

To comply with the last requirement, the inverter is controlled to restrict the output current rather than simply disconnect to protect the inverter from short circuits.

Suitable inverters are available with output voltage ratings up to 690Vrms line-line, which is one of the preferred standard voltages. Higher voltages are possible, but they are achieved at the expense of increased cost, lower efficiency, and lower modulation frequency, leading to higher harmonic currents sent to the grid and hence the need for auxiliary filters. It is normal therefore to use a 690V inverter connected to the grid via a transformer that steps up the voltage to the grid voltage at the point of connection.

For a land-based wind turbine this arrangement is satisfactory. However, for proposed tidal current turbines this arrangement presents several difficulties.

Firstly, a tidal-current turbine situated on the seabed would require a very large and expensive sub sea enclosure to house conversion equipment of the form described. Any fault in the equipment would require expensive marine operations to retrieve and replace the equipment, and work can be delayed by the prevailing weather conditions for long periods. In general, it is desirable therefore that as much equipment as possible be located at the receiving end of the cable that brings the power from the turbine to shore for connection to the grid, or to an offshore platform housing a special substation receiving power from a collection of such turbines.

Because of the transmission distance, it is preferable to use a moderately high transmission voltage, to reduce transmission losses. For example, to transmit 5 MW over a distance of 5 km via a two-core cable having 250 mm$^2$ conductor cross section with a transmission loss of 4% requires an operating voltage of about 10 kV. Voltages of this magnitude can be generated by electrical generators, and so the possibility exists of a system that requires no electrical power conversion equipment at the turbine.

Because of the high cost of sub sea cable and its installation, it is desirable to have as many turbines as possible sharing a common cable. If the electrical output of each turbine is AC, then their outputs must be synchronised if they are to be connected together. However, if the turbine outputs are DC, then they may safely be connected in parallel, provided that they can operate at the same voltage.

Because of the high cost and the risk of failures of pitch-control mechanisms in a sub sea environment, it is preferred to use turbines with fixed-pitch blades. Because of the simplicity and efficiency, it is further preferred to use an electrical generator driven directly by the turbine without an intermediate gearbox, and to use permanent magnet excitation of the generator field. The AC output is easily and efficiently converted to DC by means of diodes, which may be embedded in the generator winding or the terminal box. The rotational speed of the turbine and generator and the associated output power then depend on the prevailing flow and on the voltage of the DC system into which the turbine-generator-diode feeds.

A preferred electrical arrangement for a group of tidal-current turbines is therefore as illustrated in FIG. 1, which shows a series of turbine generator machines 10 producing direct current output (via rectifying diodes 12). The generator machines 10 are connected in parallel by a set of short cables 14 and a longer cable 16 to a receiving station 18. Receiving station 18 may be on shore, or may be provided on an offshore platform where access is possible for servicing the equipment. The output of the receiving station 18 is connected to the AC power grid.

A known method for converting HVDC to AC power is through the use of a thyristor inverter circuit. A three-phase current source thyristor inverter is illustrated in FIG. 2, having an array of thyristors 100. During operation, a DC voltage is applied across terminal A. The phases of the signals controlling the firing angles of the thyristors 100 are staggered, such that a three-phase AC signal is provided at terminals X, Y, and Z. Thyristor inverters provide the advantages of a combination of efficiency and reliability, along with being relatively inexpensive.

While current source thyristor inverters are known to be used for the conversion of HVDC to AC power, current source thyristor inverters are in general not suitable for grid connection, as they generates large amplitude harmonic currents and draw reactive power from the grid. Furthermore, a current source thyristor inverter relies on the grid for the voltage to turn off the thyristors at the end of their conduction period, and so it fails to operate during a low voltage grid fault.

Michael Owen, "Homopolar Electro-mechanical Rotary Power Converter (HERPC), IEEE Melecon 2004, May 12-15, 2004, Dubrovnik, Croatia, discloses a power conversion system for converting high voltage DC power to AC grid supply power, the system comprising a line voltage input for receiving a high voltage DC power input, a converter module for converting said high voltage DC power input to AC power, a synchronous motor, said synchronous motor driven by the AC power provided by said converter module; and a synchronous generator operable to provide AC output power for connection to a grid supply, wherein said synchronous generator is driven by said synchronous motor.

SUMMARY OF THE INVENTION

Accordingly, there is provided a power conversion system, including a DC to AC converter that can operate at a high DC voltage, and which meets all the requirements of the grid code As the synchronous generator is driven by a synchronous motor, there is a mechanical isolation stage that prevents the feeding through of any harmonics from the original DC input signal, or from the converted AC signal. While the invention is intended primarily for use with arrays of tidal turbines, it will be understood that it may be used in other power conversion environments, e.g. offshore wind turbines or wave power converters. Furthermore, land-based wind turbines of a relatively simple and economical design could be realised for use with a power conversion system according to the invention. It will be understood that the drive of the synchronous generator be directly connected to the shaft of the synchronous motor, or there may be any suitable mechanical coupling between the motor and the generator.

In particular embodiments the converter module comprises a polyphase thyristor bridge inverter.

The number of phases of the polyphase thyristor bridge inverter may be chosen to reduce the effects of harmonic currents fed to the synchronous motor, and/or ripple current and voltage fed back to the line voltage input.

The converter module may comprise a three-phase thyristor bridge inverter.

The phase number of the synchronous motor may be equal to the number of phases in the polyphase thyristor bridge inverter.

Alternatively, the converter module further comprises a transformer for converting the output of the polyphase thyristor bridge inverter to AC power having a voltage suitable for driving said synchronous motor.

In particular embodiments the system further comprises a controller, the controller operable to control the real power component of said AC output power by adjusting the phase angles of the thyristor bridge inverter to vary the DC line voltage input to regulate the operation of said turbine generator.

As the thyristor bridge inverter operation is adjusted, this allows for the variation of the DC line voltage for the associated turbine generators. Adjustment of the line voltage affects the operating conditions of the turbines, and accordingly allows for the regulation of the real power provided by the conversion system to the grid.

In addition or alternatively, said synchronous motor is a field winding type synchronous motor, the system comprising a controller operable to control the real power component of said AC output power by adjusting the field winding excitation of the synchronous motor to vary the DC line voltage input to regulate the operation of said turbine generator.

Similarly, as the excitation field of the synchronous motor is varied, the AC voltage at the motor terminals, and consequently the DC line voltage, is varied, allowing for the real power component of the output AC power to be regulated by adjustment of the associated turbines' operating conditions.

In particular embodiments the system further comprises an auxiliary load circuit provided in parallel with said synchronous motor, wherein said system is operable to supply at least a portion of the AC power provided by said converter module to said auxiliary load circuit.

The provision of an auxiliary load circuit means that any surplus power generated by the associated turbine generators may be discharged into the load circuit, allowing the conversion system to satisfy the required grid conditions.

The auxiliary load circuit may comprise an energy storage device to store AC power from said converter module, wherein said energy storage device is further operable to selectively provide AC power stored in the device to said synchronous motor.

As the auxiliary load circuit comprises an energy storage device, e.g. a battery, a flywheel, a capacitor, etc., the surplus power that is generated by the associated turbines may be stored and provided to the energy conversion system at a later stage. This may be the case for a tidal turbine generator, wherein surplus power may be stored during a period of high tidal flow, and released back into the conversion system (and, by extension, the power grid) during a period of low tidal flow and/or during a period of high demand on the grid.

Additionally or alternatively, the auxiliary load circuit comprises a load bank.

A load bank can be used as an effective method of discarding excess power, and ensuring the conversion system continues to satisfy the grid requirements.

There is further provided a method for converting high voltage DC power from a turbine generator to AC grid supply power.

In particular embodiments the method may comprise the further step of controlling the real power output of a synchronous generator by varying the line voltage of a DC power input to adjust the operation of a turbine generator.

The method may also include a step of converting that comprises controlling the phase angles of a polyphase thyristor bridge inverter, and wherein said controlling step comprises adjusting the phase angles of the thyristor bridge inverter to vary the DC line voltage input.

Additionally or alternatively, said controlling step comprises adjusting the excitation of the synchronous motor to vary the line voltage of the DC power input.

In particular embodiments the method further comprises the step of diverting at least a portion of said converted AC power to an auxiliary load circuit when the output of the synchronous generator exceeds a required level.

BRIEF DESCRIPTION OF THE DRAWINGS

Embodiments of the invention will now be described, by way of example only, with reference to the accompanying drawings, in which.

DESCRIPTION OF THE PREFERRED EMBODIMENTS

In order to provide a conversion system having the required isolation, combined with the appropriate real and reactive power control, power is delivered to the AC grid by a synchronous generator which is driven by an electric motor. The motor is supplied with power from the high voltage direct current received from one or more turbines and converted to a form suitable for feeding to the motor.

Figure 1:
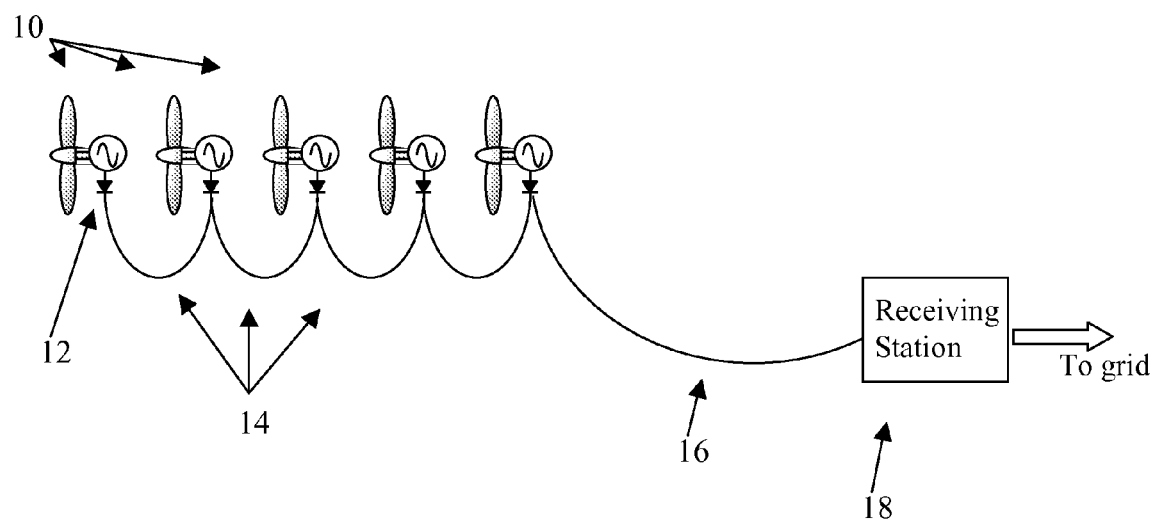
FIG. 1 illustrates a prior art setup of tidal turbines.
Figure 2:
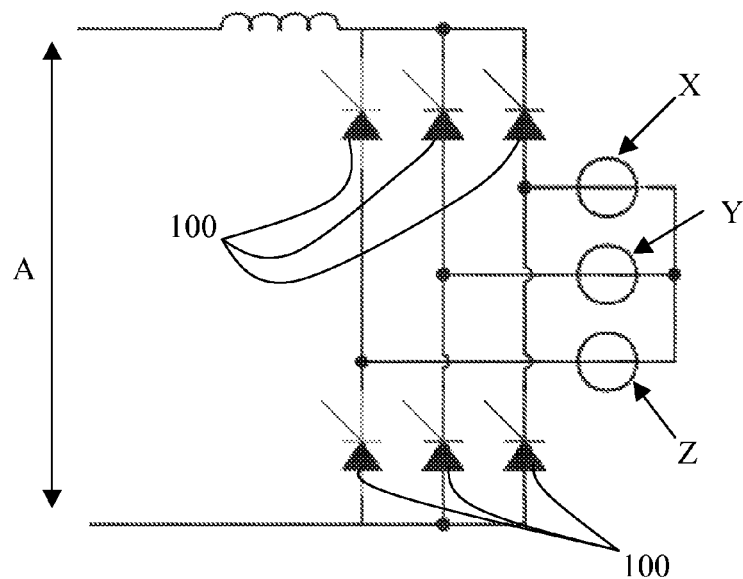
FIG. 2 illustrates a known thyristor inverter circuit.
Figure 3:
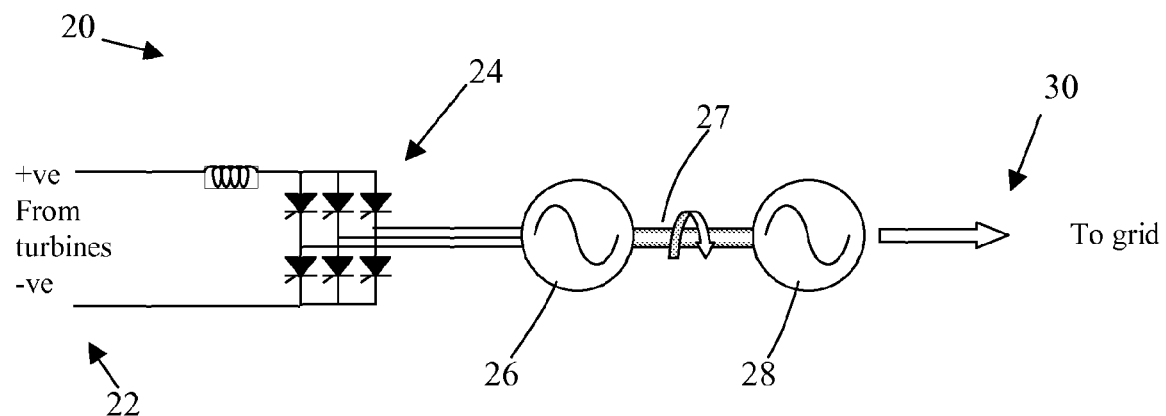
FIG. 3 is a view of a power conversion system according to the invention.

With reference to FIG. 3, an electrical power conversion system in accordance with an aspect of the invention is indicated generally at 20. High voltage DC (HVDC) power is provided at the input terminals 22. The incoming HVDC is converted to AC by means of a current-source thyristor inverter 24. Individual thyristors are available with voltage ratings up to about 8 kV. Therefore, the circuit illustrated in FIG. 3 would be suitable for a system with DC voltage up to approximately 5 kV.

The converted AC power is then used to drive a synchronous motor 26. As the incoming HVDC power would normally be at too high a voltage for a DC electric motor to be a practical choice of motor type, accordingly the arrangement of FIG. 3 utilises an AC synchronous motor 26 with either a conventional field winding or permanent magnets for excitation.

The output of the synchronous motor 26 (shaft 27) is coupled to the input of a synchronous generator 28. The synchronous generator 28 provides an AC output 30, which can be easily connected directly to the AC power grid. Such a synchronous generator may be of the same type as may be found in conventional power stations fuelled by fossil fuels. Such generators will meet most of the requirements of the grid code, and are available with power ratings up to 1 GW.

As stated above, in general, a current source thyristor inverter is not suitable for grid connection. However, in the system of the invention, the current-source thyristor inverter is not connected to the grid but to the synchronous motor, which provides the necessary reactive power and the voltage for turning off the thyristors as required. Furthermore, the synchronous motor is largely not affected by the harmonic currents.

The mechanical coupling of the synchronous motor to drive the synchronous generator provides mechanical isolation of the imperfections of the thyristor inverter from the grid connection. Accordingly, the system of FIG. 3 provides a conversion system for converting HVDC to AC grid supply.

As stated above, the system of FIG. 3 would be suitable for a system with a DC input voltage up to approximately 5 kV. However, if the maximum DC input voltage is higher than this value, e.g. up to 10 kV, then the initial conversion stage may be altered. For example, as can be seen in FIG. 4, the thyristor bridge 24 is constructed using two thyristors in series, allowing for a higher input voltage rating.

Figure 5:
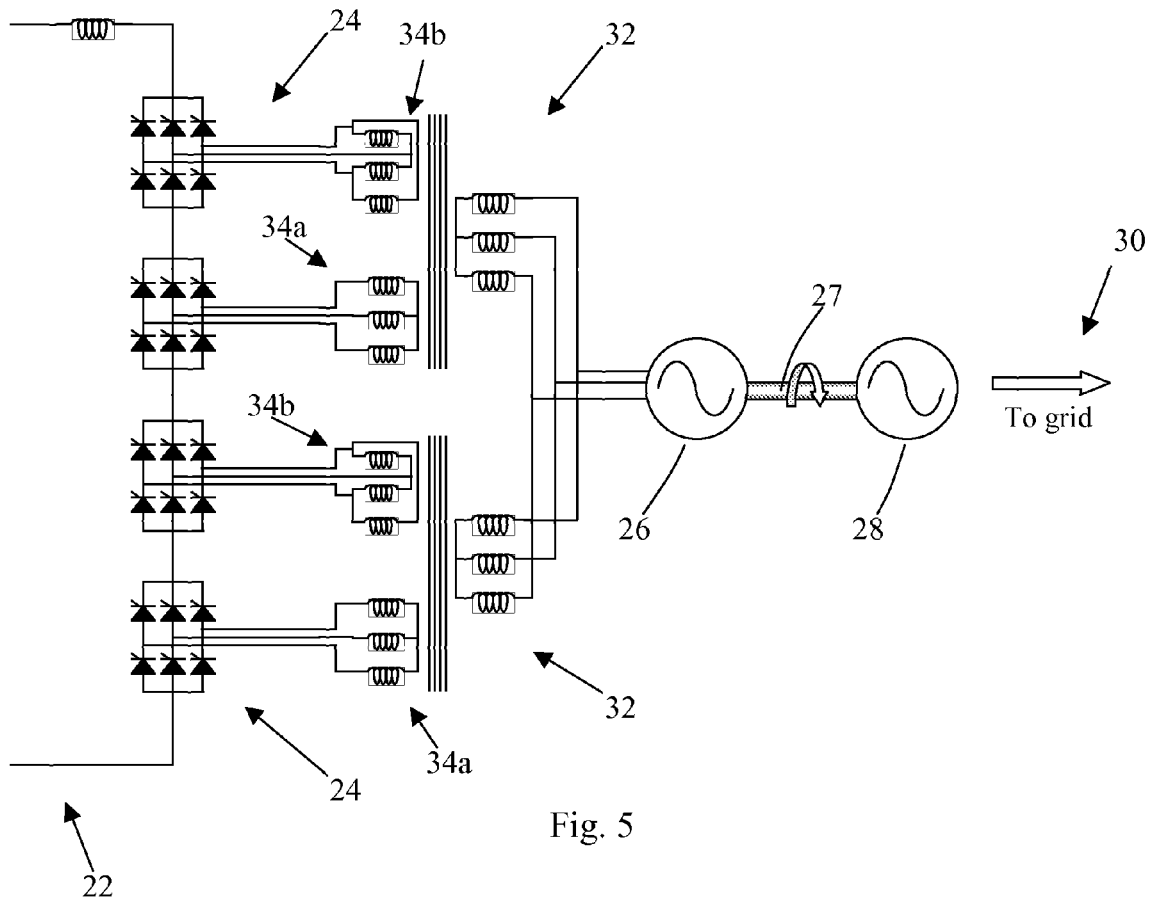
FIG. 5 is a view of a second enhancement of the system of FIG. 3.

Alternatively, with regard to the circuit of FIG. 5, two or more complete thyristor inverters 24 may be connected in series at their DC input, with their AC outputs combined as illustrated in FIG. 5, as inputs to a pair of converter transformers 32. The AC output of the transformers 32 is then combined, and provided as the input to the synchronous motor 26.

Each of the converter transformers 32 shown in FIG. 5 has two separate input windings 34, each supplied by a dedicated inverter bridge inverter—one winding 34a is star-connected and the other 34b is delta-connected. The two bridges supply currents that differ in phase by 30 electrical degrees, and the current at the output winding follows a twelve-pulse pattern. This has much smaller harmonic content than the six-pulse pattern produced by a single three-phase bridge. This arrangement for reducing the harmonic content of the current in rectifier and thyristor circuits avoids some of the loss in the synchronous motor 26 associated with harmonic currents.

Figure 4:
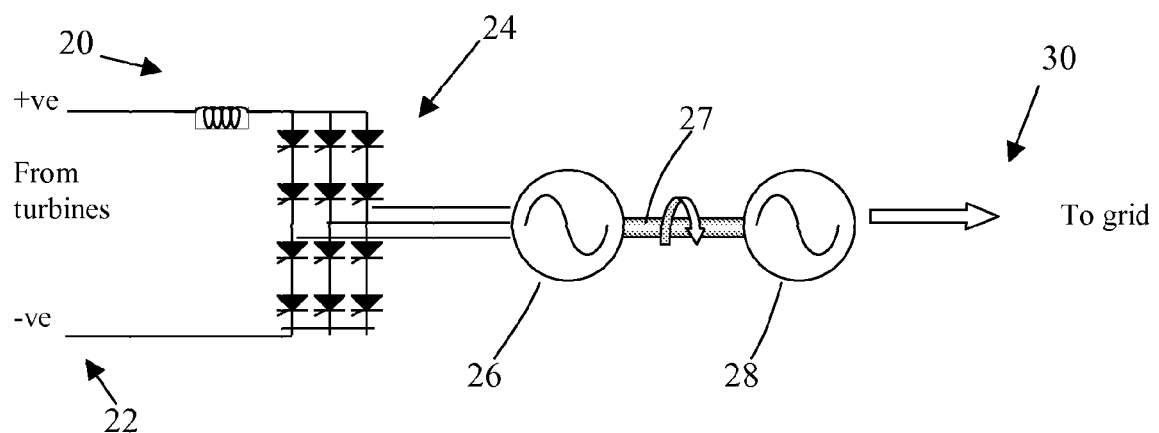
FIG. 4 is a view of a first enhancement of the system of FIG. 3.

The systems illustrated in FIGS. 3-5 use three-phase inverters, but it would be possible to use different numbers of phases as desired. This may be preferable in order to restrict harmonic current fed to the synchronous motor 26 or ripple current and voltage on the DC system.

It will be understood that while the AC output from the current source thyristor inverters 24 may be converted to three-phase by means of a suitably connected transformer 32, alternatively a the synchronous motor 26 may be configured to have the same number of phases as the inverters 24 used.

In general, a thyristor inverter 24 requires an AC voltage with a peak value that exceeds the input DC voltage. A converter transformer 34 therefore has the further purpose in matching the voltages of the thyristor inverter 24 to a value that matches the rating of an associated motor 26.

The rotational speed of the synchronous generator 28 is coupled to the frequency of the AC grid. For example, a two-pole generator connected to a 50 Hz grid must rotate at 3000 rpm, a four pole machine rotates at 1500 rpm, a six-pole machine at 1000 rpm, etc. The preferred mechanical arrangement is to couple the motor 26 and generator 28 directly, in which case the motor 26 rotates at the same speed. It is not necessary for the motor 26 to have the same number of poles as the generator 28. Similarly, the frequency of the AC currents and voltages at the AC terminals of the motor 26 is tied to the rotational speed of the motor 26.

If the pole number of the motor 26 and the pole number of the generator 28 are equal, and the two machines are, directly coupled via shaft 27 to run at the same rotational speed, then the frequency of the voltage and current at the input to the motor 26 is equal to the frequency of the ac grid—this arrangement allows for identical machines to be used for both the motor 26 and the generator 28.

If the motor 26 has a higher pole number than the generator 28, then the motor frequency is higher than the grid frequency. Alternatively if the coupling between motor 26 and generator 28 causes the motor 26 to rotate faster than the generator 28—for example by means of a gearbox—then the motor frequency will be higher than the generator frequency.

Conversely, if the motor 26 pole number is less than the generator 28 pole number, or if the rotational speed of the motor 26 is lower than the rotational speed of the generator 28 (due to the coupling used between the two machines), then motor frequency is lower than the grid frequency.

For example, a six-pole motor driving a four-pole generator connected to a 50 Hz grid would require a supply frequency of 75 Hz. One advantage in arranging for the motor frequency to be raised in this manner is that the physical size and the efficiency of a transformer depend partly on the operating frequency. By selection of suitable operating frequencies, the converter transformers 34 accordingly can be made smaller and more efficient.

Figure 6:
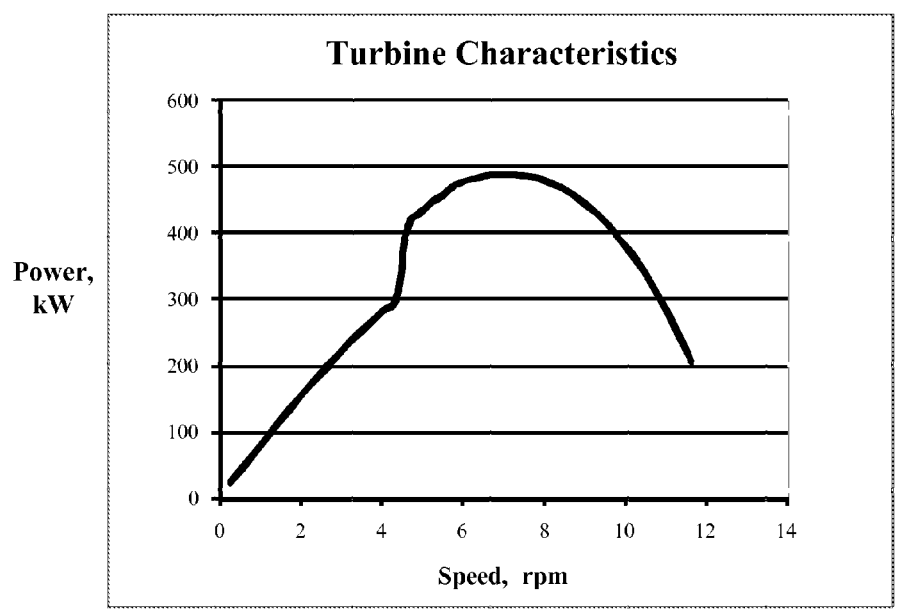
FIG. 6 is a plot of a sample turbine characteristic curve.

An example of a turbine characteristic curve is illustrated in FIG. 6. In order to control the real power delivered to the grid 30, the DC voltage may be controlled, which in turn affects the operating conditions of the associated turbines and the power delivered by them. For example, if the voltage is raised, then the speed of each turbine will increase, leading to a change in the power generated according to the typical turbine characteristic.

Figure 7:
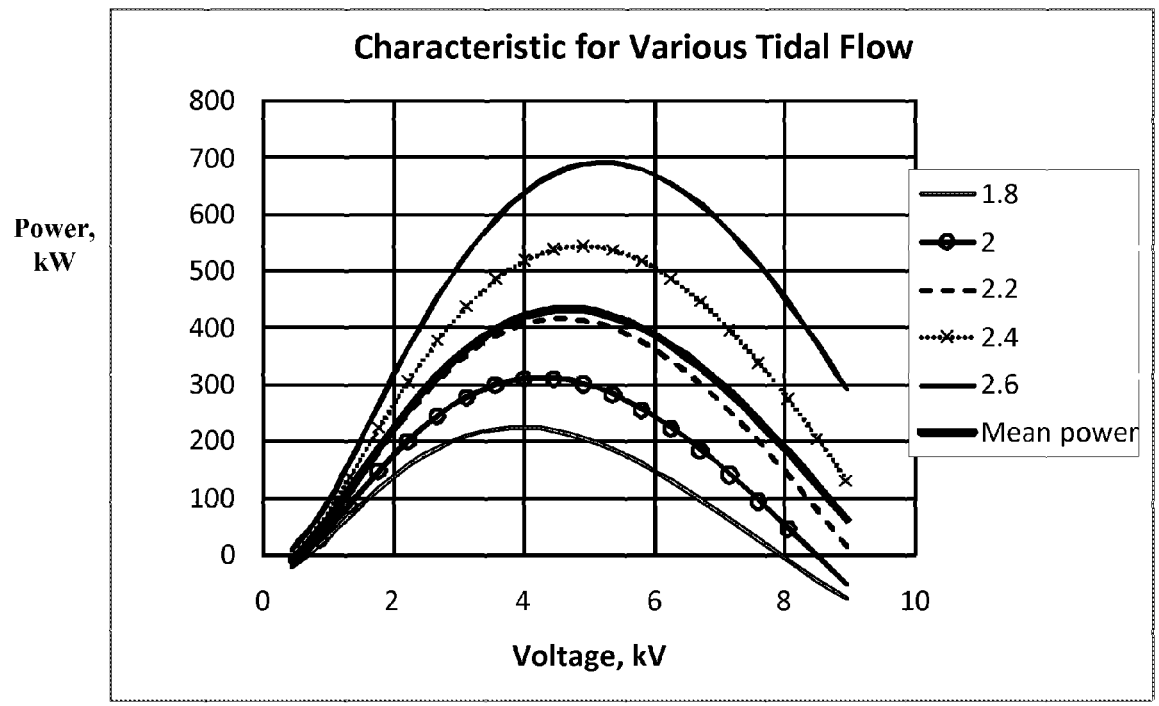
FIG. 7 is a plot of turbine characteristic curves for a set of five turbines operating in an array with different of tidal velocities.

In practice, in a group of turbines each will be subjected to a different flow from the others, because of variations in flow across the area of seabed. Therefore, each turbine has a different characteristic of Power vs. Speed (and hence voltage) but the group as a whole has an aggregate characteristic of Power vs. DC voltage. FIG. 7 illustrates the example of five turbines operating together, but with different of tidal velocities ranging from 1.8 to 2.6 m/s. If these turbines were connected in parallel so that they all operated at, say, 5 kV, then the total electrical power would be approximately 2100 kW. The turbine with highest flow would be operating at a slightly lower voltage than optimum, and that with lowest flow with a voltage, and hence speed, slightly higher than optimum. If the voltage were raised to, say, 6 kV, then the total power would be reduced to about 1900 kW. Raising the voltage to 8 kV reduces the total power to less than 1 MW. Voltage control is therefore a suitable means of adjusting the power as required for compliance with the grid code.

The DC voltage may be adjusted by means of phase control of the switching signals fed to the thyristor gate terminals of the thyristor inverters 24 used. Alternatively, if the synchronous motor 26 is excited by a conventional field winding, the excitation of the synchronous motor 26 may be controlled so that the AC voltage at its terminals, and in turn the DC line voltage presented to the associated turbines, is adjusted as required.

Figure 8:
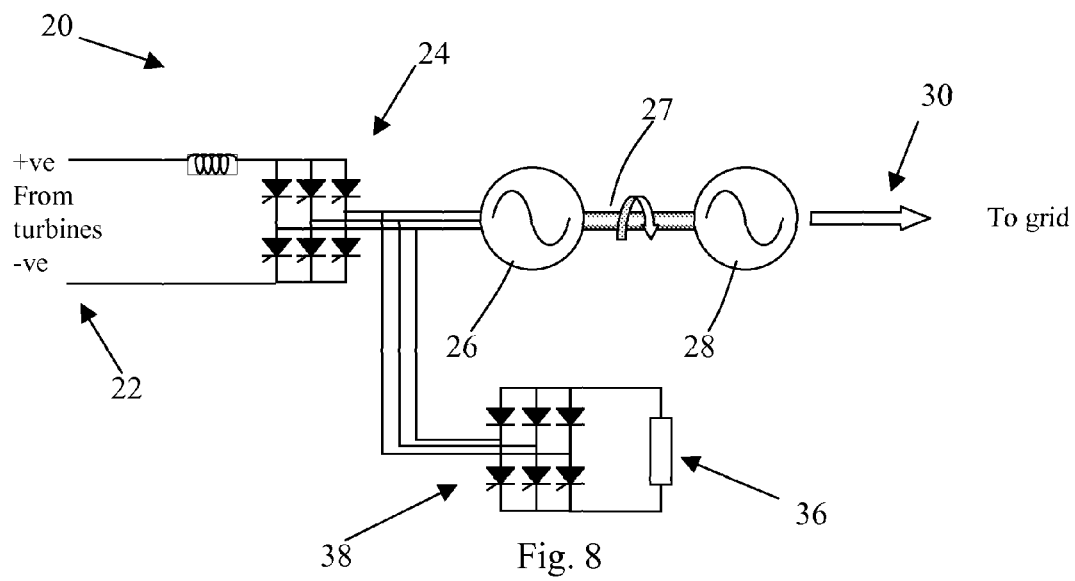
FIG. 8 is a view of the system of FIG. 3 further comprising a load bank circuit.

FIG. 8 illustrates a further alternate embodiment, wherein control of the power delivered to the grid 30 may be affected by discarding surplus power into an auxiliary load in parallel with the synchronous motor 26, such as a resistive load bank 36. In FIG. 8, a resistive load bank 36 is controlled by a half-controlled thyristor bridge inverter 38, which is all that is required for controlled rectification. The half-controlled bridge 38 uses the voltage of the synchronous motor 26 to turn off the thyristors of the bridge 38, and to provide the reactive power absorbed by the bridge 38.

Figure 9:
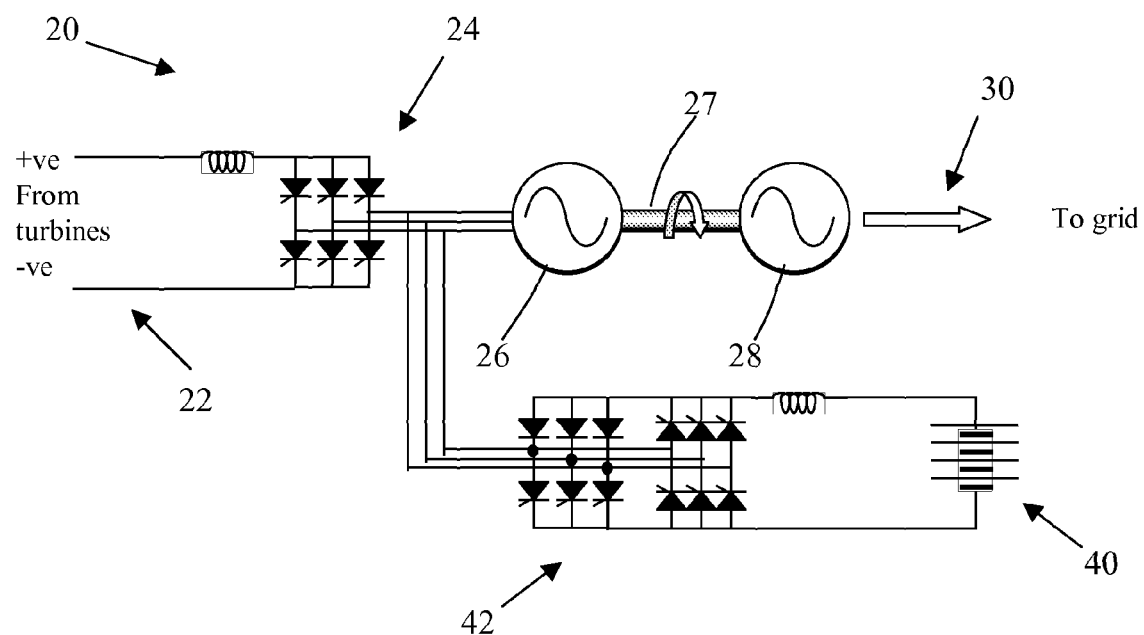
FIG. 9 is a view of the system of FIG. 3 further comprising an energy storage device circuit.

Alternatively, as shown in FIG. 9, surplus power is provided to an energy storage device, such as a battery 40, in parallel with the drive motor 26, the battery 40 coupled with an appropriate rectifier circuit 42. The system illustrated in FIG. 9 not only meets the need for power control, but it also offers the possibility of using the energy storage system (battery 40) to absorb energy from the turbines during periods of high tidal flow and to provide this excess power to the grid 30 at a later time.

It is expected that periods of high tidal flow when the turbines produce high power will often not coincide with periods of high demand on the grid 30. The energy storage system can therefore increase the value of the energy generated, as well as provide the means for complying with the power and frequency regulation aspect of the grid code. In addition, the energy system can draw energy from the grid 30 at times when tidal flow is low by operating the synchronous motor 26 and generator 28 in a reverse power flow configuration, whereby the motor 26 operates as a generator and vice versa. In this case, energy can be absorbed from the grid 30 at times of low demand and returned at times of high demand. This provides a further additional advantage of the embodiment of FIG. 9.

The invention is not limited to the embodiments described herein but can be amended or modified without departing from the scope of the present invention.

The invention claimed is:

1. A power conversion system for converting a high voltage DC power input from one or more turbine generators to an AC grid supply power output, the system comprising:
    a line voltage input for receiving said high voltage DC power input exclusively from said one or more turbine generators;
    a converter module for converting said high voltage DC power input to an AC power output;
    a synchronous motor, said synchronous motor driven by said AC power output provided by said converter module; and
    a synchronous generator, separate from said converter module, operable to provide said AC grid supply power output for connection to a grid supply;
    wherein said synchronous generator is driven by said synchronous motor, and wherein said converter module is a thyristor bridge inverter coupled between said line voltage input and said synchronous motor to provide said AC power output to said motor to drive said motor, and wherein said synchronous motor is coupled between said thyristor bridge inverter and said synchronous generator to drive said synchronous generator and separate said thryistor bridge inverter from said synchronous generator to isolate said thyristor bridge inverter from said gird supply.

2. The system as claimed in claim 1, wherein said thyristor bridge inverter is a polyphase thyristor bridge inverter.

3. The system as claimed in claim 2, wherein the phase number of said synchronous motor is equal to the number of phases in the polyphase thyristor bridge inverter.

4. The system as claimed in claim 2, wherein the converter module further comprises a transformer for converting the output of the polyphase thyristor bridge inverter to AC power having a phase suitable for driving said synchronous motor.

5. The system as claimed in claim 1, wherein said thyristor bridge inverter is a three-phase thyristor bridge inverter.

6. The system as claimed in claim 1, wherein the system further comprises a controller, the controller operable to control a real power component of said AC grid supply power output by adjusting the phase angles of the thyristor bridge inverter to vary the DC line voltage input to regulate the operation of said one or more turbine generators.

7. The system as claimed in claim 1, wherein said synchronous motor is a field winding type synchronous motor, the system comprising a controller operable to control a real power component of said AC grid supply power output by adjusting the field winding excitation of the synchronous motor to vary the DC line voltage input to regulate the operation of said one or more turbine generators.

8. The system as claimed in claim 1, wherein the system further comprises an auxiliary load circuit provided in parallel with said synchronous motor, wherein said system is operable to supply at least a portion of the AC power output provided by said converter module to said auxiliary load circuit.

9. The system as claimed in claim 8, wherein the auxiliary load circuit comprises an energy storage device to store AC power from said converter module, wherein said energy storage device is further operable to selectively provide AC power stored in the device to said synchronous motor.

10. The system as claimed in claim 8, wherein the auxiliary load circuit comprises a load bank.

11. A method for converting a high voltage DC power input from one or more turbine generators to an AC grid supply power output, comprising the steps of:

providing to a line voltage input, a high voltage DC power input received exclusively from one or more turbine generators;

converting said high voltage DC power input to an AC power output using a thyristor bridge inverter;

driving a synchronous motor with said converted AC power output;

driving a synchronous generator with the output of said synchronous motor, wherein said synchronous generator is operable to output said AC grid supply power output; and controlling a real power output of the synchronous generator by adjusting the phase angles of the thyristor bridge inverter to vary the DC line voltage input to adjust the operation of said one or more turbine generators.

12. The method of claim 11, wherein said controlling step comprises adjusting the excitation of the synchronous motor to vary the line voltage of the DC power input.

13. The method of claim 11, wherein the method further comprises the step of diverting at least a portion of said converted AC power output to an auxiliary load circuit when the output of the synchronous generator exceeds a required level.

* * * * *